United States Patent
Kim (10) Patent No.: US 10,148,605 B2
(45) Date of Patent: Dec. 4, 2018

(54) METHOD FOR PROCESSING INVITATION INFORMATION AND SERVICE SERVER, MOBILE COMMUNICATION TERMINAL AND COMPUTER-READABLE RECORDING MEDIUM FOR PERFORMING THE SAME

(71) Applicant: Camp Mobile Corporation, Seoul (KR)

(72) Inventor: Dae Seong Kim, Seongnam-si (KR)

(73) Assignee: Camp Mobile Corporation, Seoul (KR)

( * ) Notice: Subject to any disclaimer, the term of this patent is extended or adjusted under 35 U.S.C. 154(b) by 1049 days.

(21) Appl. No.: 13/848,452

(22) Filed: Mar. 21, 2013

(65) Prior Publication Data
US 2014/0019582 A1 Jan. 16, 2014

(30) Foreign Application Priority Data
Jul. 12, 2012 (KR) .......................... 10-2012-0075960

(51) Int. Cl.
*H04L 12/58* (2006.01)

(52) U.S. Cl.
CPC .............. *H04L 51/10* (2013.01); *H04L 51/32* (2013.01)

(58) Field of Classification Search
CPC .................................. H04L 12/58; H04L 51/10
See application file for complete search history.

(56) References Cited

U.S. PATENT DOCUMENTS

| | | | | |
|---|---|---|---|---|
| 6,300,873 | B1 * | 10/2001 | Kucharczyk | A47G 29/141 235/382.5 |
| 8,041,373 | B2 * | 10/2011 | Bengtsson | H04L 67/34 455/414.1 |
| 2004/0259641 | A1 * | 12/2004 | Ho | A63F 13/12 463/42 |

(Continued)

FOREIGN PATENT DOCUMENTS

| | | |
|---|---|---|
| JP | 2009541819 A | 11/2009 |
| JP | 2012512448 A | 5/2012 |

OTHER PUBLICATIONS

Japanese Office Action dated Jan. 30, 2017 issued in corresponding Japanese Patent Application No. 2013-032143 (with translation).

*Primary Examiner* — Jason D Recek
(74) *Attorney, Agent, or Firm* — Harness, Dickey & Pierce, P.L.C.

(57) ABSTRACT

Exemplary embodiments of the invention disclose a method for processing invitation information using a messaging service of a mobile communication terminal, and a service server, a mobile communication terminal, and a computer readable recording medium for performing the same. The method for processing invitation information by a service server includes: generating the invitation information according to a request from an invitation transmitting mobile communication terminal; verifying identification information of an invitation receiving mobile communication terminal in response to the invitation information being requested from the invitation receiving mobile communication terminal installing a service application; and transmitting the invitation information to the invitation receiving mobile communication terminal when the identification information is verified.

20 Claims, 5 Drawing Sheets

(56) References Cited

U.S. PATENT DOCUMENTS

| | | | |
|---|---|---|---|
| 2005/0144288 A1* | 6/2005 | Liao | H04L 29/06 709/227 |
| 2007/0129014 A1* | 6/2007 | Bertorello | H04L 12/1813 455/41.2 |
| 2010/0146500 A1* | 6/2010 | Joubert | G06F 8/61 717/178 |
| 2010/0319062 A1* | 12/2010 | Danieli | H04L 12/1818 726/7 |
| 2011/0228922 A1* | 9/2011 | Dhara | H04L 12/1818 379/202.01 |
| 2011/0243375 A1* | 10/2011 | Rhoads | G06F 17/30876 382/100 |
| 2012/0137315 A1* | 5/2012 | Christopher | H04N 21/2543 725/5 |
| 2013/0254413 A1* | 9/2013 | Steele | H04L 67/1068 709/228 |

* cited by examiner

METHOD FOR PROCESSING INVITATION INFORMATION AND SERVICE SERVER, MOBILE COMMUNICATION TERMINAL AND COMPUTER-READABLE RECORDING MEDIUM FOR PERFORMING THE SAME

CROSS REFERENCE TO RELATED APPLICATIONS

This application claims priority from and the benefit of Korean Patent Application No. 10-2012-0075960, filed on Jul. 12, 2012, which is hereby incorporated by reference for all purposes as if fully set forth herein.

BACKGROUND OF THE INVENTION

Field of the Invention

Exemplary embodiments of the invention relate to a method for processing invitation information using a messaging service, and a service server, a mobile communication terminal, and a computer readable recording medium for performing the same.

Discussion of the Background

The use of mobile communication terminals has significantly increased due to the rapid developments in technology. Through networks such as the Internet, information search functions, service applications, and additional mobile communication terminal functionality, smart phones are increasingly used to provide various services such as a messenger service, a game service, a social network service, etc. The various kinds of services (e.g., a social network service, a mobile messenger service, a game service, and the like) may also enable a user to perform community activity together with other users. These services are increasingly being installed via service applications by receiving invitations from other users of the services.

A service application may be installed by a user after receiving invitations to use the service application from other users. If the service application has already been installed in a terminal of the user, the service application is automatically driven to process a received invitation. If the service application is not installed in the terminal of the user and the invitation is not automatically processed, a process for driving the service application to reselect the invitation or to request a messaging system for confirmation of the invitation may be needed. However, such a procedure for installing a service application may cause inconvenience to the user.

SUMMARY OF THE INVENTION

Exemplary embodiments of the invention provide solutions to the problem of the conventional art described above.

Additional features of the invention will be set forth in the description which follows, and in part will be apparent from the description, or may be learned by practice of the invention.

Exemplary embodiments of the present invention disclose a method for processing invitation information. The method includes providing the invitation information in response to a request from a first terminal, verifying identification information of a second terminal in response to the invitation information being requested by the second terminal, and transmitting the invitation information to the second terminal in response to verifying the identification information.

Exemplary embodiments of the invention also disclose a method for processing invitation information. The method includes receiving the invitation information from a first terminal; accessing a service application installation page using the invitation information and downloading and installing a service application, transmitting a request to a service server for the invitation information when driving the service application for a first time. The method further includes transmitting identification information of the first terminal stored in a phone book to the service server in response to a confirmation request for identification information of the first terminal from the service server, and receiving the invitation information from the service server and processing the received invitation information.

Exemplary embodiments of the invention also disclose a non-transitory computer readable storage medium comprising an executable program which, when executed, performs a method for processing invitation information. The method includes providing the invitation information in response to receiving a request from a first terminal, verifying identification information of a second terminal in response to the invitation information being requested from the second terminal, and transmitting the invitation information to the second terminal in response to verifying the identification information.

Exemplary embodiments of the invention also disclose a service server including an invitation information processor and a verification processor. The invitation information processor is configured to provide the invitation information in response to a request from a first terminal. The verification processor is configured to verify identification information of a second terminal in response to the invitation information being requested from the second terminal, and to transmit the invitation information to the second terminal in response to the identification information being verified.

Exemplary embodiments of the invention also disclose a mobile communication terminal including a processor. The processor is configured to cause the mobile communication terminal to receive invitation information from another terminal to download and install a service application, to transmit a request to a service server for the invitation information in response to the service application being driven for a first time, to transmit identification information of the other terminal stored in a phone book to the service server in response to receiving a verification request for the identification information of the other terminal from the service server, to receive the invitation information from the service server, and to process the received invitation information.

Exemplary embodiments of the invention also disclose a method for processing invitation information. The method includes receiving an invitation information generation request from a first terminal to provide and store the invitation information, obtaining identification information of a second terminal using the invitation information and storing the identification information with the invitation information, and obtaining identification information of the first terminal in response to a service application being installed in the second terminal, and searching the invitation information matched to the obtained identification information of the first terminal to transmit the searched invitation information to the second terminal.

Exemplary embodiments of the invention also disclose a service server including an invitation request processor and a verification processor. The invitation request processor is configured to receive an invitation information generation request from a first terminal to provide and store the invitation information, to obtain identification information of a second terminal using the invitation information, and to store the identification information in association with the invitation information. The verification processor is configured to obtain the identification information of the first terminal in response to the invitation information being requested from the second terminal installing a service application using the invitation information, and to search the invitation information matched to the obtained identification information to transmit the searched invitation information to the second terminal.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

Exemplary embodiments of the invention will be described in detail with reference to the accompanying drawings. These exemplary embodiments will be described in detail for those skilled in the art in order to practice the invention. It should be appreciated that various exemplary embodiments of the present invention are different but do not have to be exclusive. For example, specific shapes, configurations, and characteristics described in an exemplary embodiment of the present invention may be implemented in other exemplary embodiments without departing from the spirit and the scope of the invention. In addition, it should be understood that position and arrangement of individual components in each disclosed exemplary embodiment may be changed without departing from the spirit and the scope of the invention. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present. It may also be understood that for the purposes of this disclosure, "at least one of X, Y, and Z" can be construed as X only, Y only, Z only, or any combination of two or more items X, Y, and Z (e.g., XYZ, XYY, YZ, ZZ).

Hereinafter, exemplary embodiments of the invention will be described in detail with reference to the accompanying drawings so that those skilled in the art may implement exemplary embodiments of the present invention.

A mobile communication terminal may refer to any device including a memory unit and a processor for executing the various embodiments of the invention, and to, for example, support a data communication function through a mobile communication network or any other communication network, be it a wired or wireless network. In addition, the mobile communication terminal may have various other components including a receiver and/or transmitter for receiving and transmitting any type of data over a network. The mobile communication terminal may have unique identification information that may help the mobile communication terminal be identified on a network. The mobile communication terminal may be any type of electronic device, including, for example, a smart phone and an electronic pad. However, exemplary embodiments of the invention are not limited thereto.

An invitation transmitting mobile communication terminal may refer to a mobile communication terminal in which a service application for using a service provided through a service server is installed and which performs a function of transmitting invitation information to invite another user (an invitation target) that does not use the service to install the service application and use the service.

Invitation information may refer to information generated in the service server at a request of an invitation receiving mobile communication terminal and information transmitted to an invitation receiving mobile communication terminal in response to the request. The invitation information may include an installation uniform resource locator (URL) parameter for installing the service application and a driving URL parameter for driving the service application.

The invitation receiving mobile communication terminal may refer to a mobile communication terminal in which the service application for using the service provided through the service server may not be initially installed. The service application may subsequently be installed in the invitation receiving mobile communication terminal using invitation information transmitted from the invitation transmitting mobile communication terminal. The invitation receiving mobile communication terminal may also process the invitation information through the installed service application.

Figure 1:
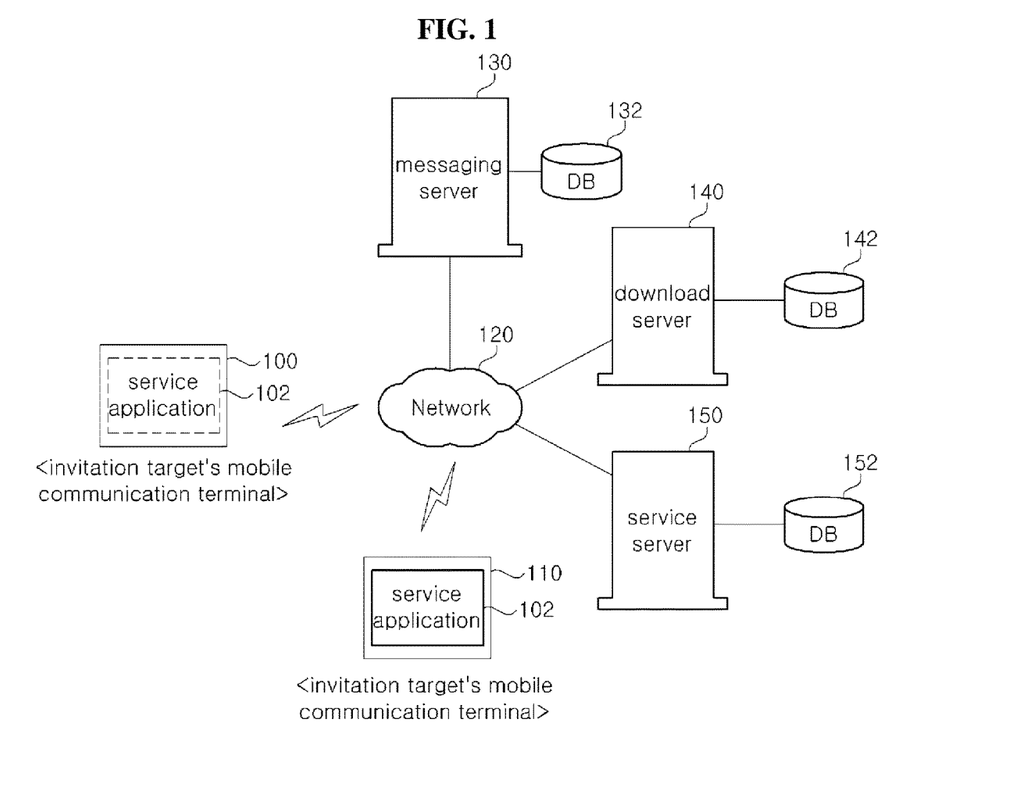
FIG. 1 is a block diagram showing a schematic configuration of a system for processing invitation information according to exemplary embodiments of the invention.

FIG. 1 is a block diagram showing a schematic configuration of a system for processing invitation information according to exemplary embodiments of the invention. As shown in FIG. 1, the system for processing invitation information may include an invitation receiving mobile communication terminal 100, an invitation transmitting mobile communication terminal 110, a network 120, a messaging server 130, a download server 140, and a service server 150.

The network 120 may connect the invitation receiving mobile communication terminal 100, the invitation transmitting mobile communication terminal 110, the messaging server 130, the download server 140, and the service server 150 to one another. The connection between the various components of the system may be any suitable type of wired or wireless communication, and may include various types of communication networks, such as a personal area network (PAN), a local area network (LAN), a metropolitan area network (MAN), a wide area network (WAN), and the like.

The invitation transmitting mobile communication terminal 110 may have a stored service application 102 for using a service provided from the service server 150. The invitation transmitting mobile communication terminal 110 may transmit an invitation information generation request to the service server 150, may receive invitation information transmitted from the service server 150 in response to the invitation information generation request, and may transmit the received invitation information to the invitation receiving mobile communication terminal 100 through the messaging server 130.

The invitation information generation request may include identification information for identifying a mobile communication terminal of a specific user (i.e., invitation target), identification information of the invitation transmitting mobile communication terminal 110 for subsequently verifying the invitation receiving mobile communication terminal 100, and/or phone book information of the invitation transmitting mobile communication terminal 110. The identification information of a mobile communication terminal may include various types of identification information including, for example, a phone number, a personal identification number (PIN), a media access control (MAC) address, an Internet Protocol (IP) address, and the like, and may be utilized to identify a corresponding mobile communication terminal on a mobile communication network and/or to transmit predetermined information to the identified mobile communication terminal. In some cases, the identification information included in the invitation information generation request may be identification information used in an interworking service, such as a legal name, avatar name, screen name, login name, or any nickname of the user to be invited. In such cases, the user of the mobile communication terminal to be invited may already be subscribed to another service, such that the identification information of the mobile communication terminal may be extracted using the name or nickname of the user used in the service to which the mobile communication terminal has subscribed. The service server 150 may be capable of interworking with the other service server providing the other service to extract the name or nickname of the user. For example, the service server 150 providing a messenger service may communicate with a separate service server providing a game service; a mobile communication terminal of a user A and a mobile communication terminal of a user B may subscribe to a game service; and only the mobile communication terminal of the user A may be subscribed to the messenger service. In such cases, the mobile communication terminal of user A may transmit an invitation request for the mobile communication terminal of the user B to the service server 150 providing the messenger service, using identification information (e.g., a nickname of user B) in the game service used in the game service. The service server 150 providing the messenger service may verify the identification information on the mobile communication terminal of the user B from the service server providing the game service based on the identification information included in the received invitation request. The service server 150 may then perform an invitation procedure using the identification information on the mobile communication terminal of the user B obtained as a result of the verification. Hereinafter, for convenience of explanation and understanding, an example in which a phone number is used as the identification information of a mobile communication terminal will be described.

The service server 150 may communicate with a service application 102 installed in mobile communication terminals 100, 110 to provide a specific service to users, may process an invitation information generation request from the invitation transmitting mobile communication terminal 110, and may process an invitation information transmission request to the invitation receiving mobile communication terminal 100.

As noted above, the service server 150 may receive the invitation information generation request from the invitation transmitting mobile communication terminal 110 to generate invitation information and may then transmit the generated invitation information to the invitation transmitting mobile communication terminal 110. When generating the invitation information, the service server 150 may store the generated invitation information together with a phone number and phone book of the invitation transmitting mobile communication terminal 110, and a phone number of the invitation receiving mobile communication terminal 100.

The invitation information generated in the service server 150 may include an invitation phrase, an installation URL parameter for installing the service application, and a driving URL parameter for driving the service application. The invitation phrase may be any phrase in any language inviting a user to join the service and download the service application. For example, the invitation phrase may include one or more phrases inducing recipients of the invitation phrase to participate in various service related actions. The invitation phrase may also include any additional textual or visual information. If service application 102 has been already installed in the invitation receiving mobile communication terminal 100 receiving the invitation information and a user of the invitation receiving mobile communication terminal 100 clicks on the received invitation information, the service application 102 may be driven using the driving URL parameter, such that the invitation information is processed. If the service application 102 has not been installed in the invitation receiving mobile communication terminal 100, the invitation receiving mobile communication terminal 100 accesses the download server 140 using the installation URL parameter to install the service application 102.

The installation URL parameter may include a URL address of a download site supported by download server 140 from which the service application 102 for using the service of the service server 150 may be stored. The service server 150 may be configured to set a bridge page associated with the installation URL parameter to the URL address, and to map the invitation information used to access the download site to the identification information (e.g., phone number, an internet protocol (IP) address) of the invitation receiving mobile communication terminal 100. Accordingly, when a user of the invitation receiving mobile communication terminal 100 clicks on the invitation information to install the service application 102 and the invitation receiving mobile communication terminal 100 accesses the download site via a bridge page uniquely generated for each invitation information, the service server 150 may identify the invitation information used to access the bridge page and the IP address of the invitation receiving mobile communication terminal 100 using the mapping of the invitation information and the IP address of the invitation receiving mobile communication terminal 100. In some cases, a URL of a download page may be generated to facilitate a user to download the service application 102 without using the bridge page. The page visited by the invitation receiving mobile communication terminal 100 to install the service application 102 may have a URL address unique to each invitation when the bridge page is not used.

A driving URL parameter may include service application related information to drive the service application 102. When a network service provided by the service server 150 is a social network service, examples of the service application related information include sharing request information of a specific content and friend request information. When the network service provided by the service server 150 is a messenger service, examples of the service application related information include chatting request information and acquaintance relationship request information. When the network service provided by the service server 150 is a network game service, examples of the service application related information include battle request information, game participation request information, and cooperation game progress request information. It should be obvious to one of skill in the art that various types of service application related information may be provided according to the type of network service being provided by the service server 150.

The service server 150 may also monitor whether a mobile communication terminal accesses the bridge page corresponding to the installation URL included in the invitation information and may determine that a mobile communication terminal is the invitation receiving mobile communication terminal 100 when the mobile communication terminal accesses the bridge page. The service server 150 may also map the identification information of the corresponding terminal to the invitation information including the URL address of the corresponding bridge page and store the mapped information, as in the previous operation for processing the invitation information transmission request from the invitation receiving mobile communication terminal 100. The invitation receiving mobile communication terminal 100 is primarily identified through the above-mentioned process. The mapped and stored identification information of the invitation receiving mobile communication terminal 100 is subsequently used for a verification procedure. In some cases, the mapped and stored information may be configured to be set as valid information only for a preset valid time to increase security and accuracy. In addition, after the identification information is stored and mapped, the service server 150 is configured to forward the invitation receiving mobile communication terminal 100 accessing the bridge page to a download site (application market site) in which the service application 102 may be downloaded.

The service server 150 may perform a verification procedure for transmitting the invitation information when the service server 150 receives the invitation information transmission request from the invitation transmission mobile communication terminal 110. For example, the service server 150 may verify information on the invitation receiving mobile communication terminal 100 by adopting one of a plurality of schemes according to the following two exemplary embodiments.

According to a first scheme, the service server 150 may verify, using the phone book information of a user of the invitation transmitting mobile communication terminal 110, the stored identification information of the invitation receiving mobile communication terminal 100, the phone number of the mobile communication terminal requesting the invitation information, and the current identification information of the corresponding terminal included in the invitation information generation request. For instance, when a mobile communication terminal requests the invitation information, the service server 150 may obtain the identification information (e.g., current IP information) of the mobile communication terminal requesting the invitation information and may identify the invitation information mapped to the corresponding identification information using the obtained identification information. If the identification information is, for example, an IP address, and if the mapping information between the stored IP information and the invitation information is configured to be valid for a preset valid time, the invitation information mapped to the IP information may be identified only if the invitation information transmission request is made within the valid time. After the invitation information is identified, the service server 150 may compare the stored phone book information of the invitation transmitting mobile communication terminal 110 with a phone number of the mobile communication terminal included in the invitation information transmission request. The service server 150 may then determine, using the phone number, that the mobile communication terminal requesting the invitation information is the invitation receiving mobile communication terminal 100 to which the invitation transmitting mobile communication terminal 110 transmits the invitation information if the phone number of the mobile communication terminal requesting the invitation information is stored in the phone book of the invitation transmitting mobile communication terminal 110. Accordingly, the first verification scheme may be based on whether the phone number of the mobile communication terminal requesting the invitation information is stored in a phone book of the invitation transmitting mobile communication terminal 110, and whether a predetermined relationship exists between the invitation transmitting mobile communication terminal 110 and an owner of the mobile communication terminal requesting the invitation information, such that the mobile communication terminal requesting the invitation information may be considered as the invitation receiving mobile communication terminal 100 actually transmitting the invitation information. The first verification scheme will be described in more detail with reference to FIG. 3.

In a second verification scheme, the service server 150 may verify, using the phone number of the invitation transmitting mobile communication terminal 110, the stored identification information of the invitation receiving mobile communication terminal 100, the phone book information of the mobile communication terminal requesting the invitation information, and the current identification information of the terminal included in the invitation information generation request. For example, when a mobile communication terminal requests invitation information, the service server 150 may obtain the identification information of the mobile communication terminal requesting the invitation information, and may determine the invitation information mapped to the obtained identification information. In some cases when the mapping information is valid only for a preset period of time, the invitation information mapped to the identification information may be obtained only if the invitation information transmission request is made within the valid period of time. After the invitation information is obtained, the service server 150 may generate a plurality of pseudo phone numbers similar to the phone number of the invitation transmitting mobile communication terminal 110 using an algorithm, and may transmit the phone number of the invitation transmitting mobile communication terminal 110 and the plurality of pseudo phone numbers to the mobile communication terminal requesting the invitation information. In response, the mobile communication terminal requesting the invitation information may transmit a phone number matched to a phone number stored in the phone book among the plurality of phone numbers to the service server 150. The service server 150 may then determine that the mobile communication terminal requesting the invitation information is the invitation receiving mobile communication terminal 100 if the phone number transmitted from the corresponding mobile communication terminal is the phone number of the invitation transmitting mobile communication terminal 110 to transmit the stored invitation information to the corresponding mobile communication terminal. Accordingly, second the verification scheme is based on the fact that when the phone number of the invitation transmitting mobile communication terminal 110 is accurately identified among the plurality of similar phone numbers (e.g., the phone number of the invitation transmitting mobile communication terminal 110 is stored in the phone book), a predetermined relationship is present between the invitation transmitting mobile communication terminal 110 and the mobile communication terminal requesting the invitation information, such that the invitation transmitting mobile communication terminal 110 may be considered as the transmitter of the invitation information. The second verification scheme will be described in more detail with reference to FIG. 4. While two verification schemes have been described herein above, it should be understood that various suitable verification schemes may be used without departing from the scope of the invention.

The messaging server 130 may be a server supporting a messaging service between the invitation transmitting mobile communication terminal 110 and the invitation receiving mobile communication terminal 100 through the network 120. An example of the messaging service includes an instant messenger server, an E-mail service, a mobile communication message service (a short message service (SMS), a multimedia message service (MMS), or the like), a social network service, and the like, but is not limited thereto. The messaging server 130 and the service server 150 may be integrated in one server or may be operating as separate servers.

The download server 140 may store the service application 102 for using the service provided by the service server 150 and may transmit a service application 102 to a mobile communication terminal according to a request of the mobile communication terminal accessing the download server 140. The download server 130 and the service server 150 may be integrated in one server or may be operating as separate servers (as shown in FIG. 1). In general, the messaging server 130 the download server 140, and the service server 150 may be any combination of hardware and software, and may include a storage unit for storing data and a processor for controlling the stored data.

The invitation receiving mobile communication terminal 100 may receive suggestions for subscription to services in the invitation information received from the invitation transmitting mobile communication terminal 110, and may install a service application 102 for using a corresponding service. The invitation receiving mobile communication terminal 100 may receive the invitation information from the invitation transmitting mobile communication terminal 110, access the download site via a bridge page corresponding to the installation URL parameter included in the invitation information in response to a user of the invitation receiving mobile communication terminal 100 clicking on the received invitation information, and may download, install, and drive the service application from the download server 140. The accessing, downloading, installing, and driving, as described above, may be performed by a processor and/or basic operating system installed in the invitation receiving mobile communication terminal 100. The following process may be performed by the service application 102 in the invitation receiving mobile communication terminal 100.

The service application 102 may request the service server 150 for invitation information when being initially driven in the invitation receiving mobile communication terminal 100. The service server 150 may verify whether the mobile communication terminal requesting the invitation information is the invitation receiving mobile communication terminal 100 according to the verification schemes noted above. The service application 102 may also request invitation information in the verification schemes of the service server 150, as shall be described in the examples hereinbelow.

The service application 102, in a first example corresponding to the first verification scheme, is configured to extract the phone number of the invitation receiving mobile communication terminal 100, to generate the invitation information transmission request including the extracted phone number, and to transmit the generated invitation information transmission request to the service server 150. When verification of the invitation receiving mobile communication terminal 100 is successfully performed in the service server 150 and the invitation information is transmitted, the service application 102 may receive and process the invitation information. The service application 102 may perform a specific function using the driving URL parameter in the invitation information, as described above.

The service application 102, in the second example corresponding to the second verification scheme, may transmit the invitation information transmission request to the service server 150, may receive the plurality of phone numbers (e.g., the phone number of the invitation transmitting mobile communication terminal 110 and the plurality of pseudo phone numbers) transmitted from the service server 150, may search the matched phone number among the received phone numbers in the phone book of the invitation receiving mobile communication terminal 100, and may transmit the searched phone number to the service server 150. If the transmitted phone number is the same as the phone number of the invitation transmitting mobile communication terminal 110, such that the verification succeeds, the service server 150 may transmit the invitation information to the service application 102. The service application 102 may then receive the invitation information to perform a specific function according to the driving URL parameter included in the invitation information.

If the service provided by the service server 150 is a social network service and the invitation request information includes a sharing request of a specific content, the service application 102 may output/reproduce the specific content according to the driving URL parameter included in the invitation information. If the service provided by the service server 150 is a messenger service and the invitation information includes chatting request information, the service application 102 may provide a chatting service with the invitation transmitting mobile communication terminal 110 through the service server 150 according to the driving URL parameter included in the invitation request information. If the service provided by the service server 150 is a network game service and the invitation information includes battle request information, the service application 102 may provide a battle game service with the invitation transmitting mobile communication terminal 110 through the service server 150 according to the driving URL parameter included in the invitation request information.

Figure 2A:
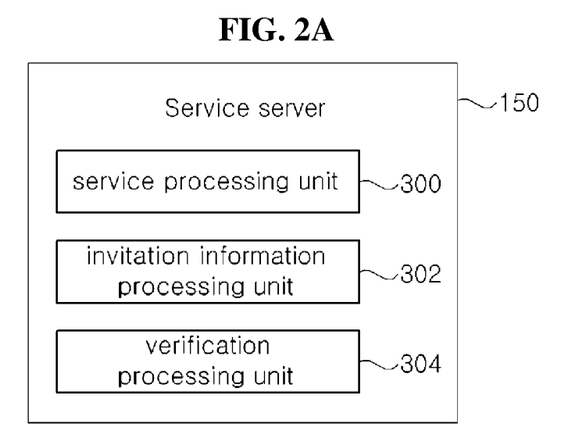
FIG. 2A is a block diagram showing a configuration of a service server according to the exemplary embodiments of the invention.

FIG. 2A is a block diagram showing a configuration of a service server 150 according to exemplary embodiments of the present invention. As shown in FIG. 2A, the service server 150 may include a service processor 300, an invitation information processor 302, and a verification processor 304.

The service processor 300 may communicate with the service application 102 installed in mobile communication terminals 100, 110 to provide a network service such as a messenger service, a game service, and the like. The network services may be conventional or known in the art. The service processor 300 may be any combination of hardware and software, and may include any suitable physical structure to process data.

The invitation information processor 302 may receive the invitation information generation request transmitted from the service application 102 installed in the invitation transmitting mobile communication terminal 110 in response to the user of the invitation transmitting mobile communication terminal 110 selecting another contact/user to send an invitation to. The invitation information processor 302 may generate the invitation information including the invitation phrase, the installation URL parameter, and the driving URL parameter based on the received invitation information generation request, and may transmit the generated invitation information to the invitation transmitting mobile communication terminal 110. In addition, the invitation information processor 302 may map and store the phone number of the invitation transmitting mobile communication terminal 110 or the phone book information stored in the invitation transmitting mobile communication terminal 110 included in the invitation information generation request, together with the generated invitation information. As noted above, the generated invitation information and phone book information may be used to subsequently verify the invitation receiving mobile communication terminal 100. The invitation information generated and stored by the invitation information processor 302 may include the installation URL parameter corresponding to the URL address of the bridge page uniquely generated according to the invitation information and the driving URL parameter corresponding to a specific action that can be performed by driving the service application 102 using the invitation information, as described above.

Further, the invitation information processor 302 may generate the bridge page if a page request for the URL address of the bridge page included in the invitation information from a specific mobile communication terminal is present, and may provide the generated bridge page to the corresponding mobile communication terminal and at the same time. The invitation information processor 302 may obtain the identification information of the corresponding mobile communication terminal, map the obtained identification information to the invitation information including the URL parameter of the bridge page, and store the obtained identification information and the mapping information. The obtained/stored identification information of the mobile communication terminal visiting the bridge page may be utilized in a process of verifying the invitation receiving mobile communication terminal 100. In addition, when obtaining and mapping the identification information are completed, the invitation information processor 302 may forward the mobile communication terminal visiting the bridge page to an application market in which the service application 102 can be downloaded. The invitation information processor 302 may be any combination of hardware and software, and may include any suitable physical structure to process data.

The verification processor 304 in the service server 150 may verify whether the mobile communication terminal requesting the invitation information is the invitation receiving mobile communication terminal 100 to which the invitation transmitting mobile communication terminal 110 would like to transmit the invitation information. The verification processor 304 may obtain identification information of a mobile communication terminal requesting the invitation information when the invitation information transmission request is received from the mobile communication terminal and may search/extract the invitation information matched to the identification information of the mobile communication terminal requesting the invitation information based on the identification information and the mapping information obtained/stored by visiting the bridge page. Through the above-mentioned functions, the verification processor 304 may identify the invitation information and the mobile communication terminal requesting the invitation information. After the requested invitation information is identified, the verification processor 304 may verify that the mobile communication terminal requesting the invitation information is the invitation receiving mobile communication terminal 100 to which the invitation transmitting mobile communication terminal 110 would like to transmit the invitation information. The verification processor 304 may be any combination of hardware and software, and may include any suitable physical structure to perform the verification functions noted above.

The verification of the mobile communication terminal may be performed using a plurality of verification schemes including the two schemes described above. According to the first verification scheme, the verification processor 304 may perform verification by comparing the phone book information (included in the invitation information generation request) of the invitation transmitting mobile communication terminal 110 with the phone number (included in the invitation information transmission request) of the mobile communication terminal requesting the invitation information. If the phone number of the mobile communication terminal requesting the invitation information is stored in the phone book of the invitation transmitting mobile communication terminal 110, the verification processor 304 may determine that the mobile communication terminal requesting the invitation information is the invitation receiving mobile communication terminal 100. Therefore, the verification processor 304 may transmit the identified invitation information to the invitation receiving mobile communication terminal 100 using the identification information.

According to the second verification scheme, the verification processor 304 may perform verification using the phone number (included in the invitation information generation request) of the invitation transmitting mobile communication terminal 110 and the phone book of the mobile communication terminal transmitting the invitation information transmission request. The verification processor 304 may perform the verification by generating a plurality of pseudo phone numbers similar to the phone number of the invitation transmitting mobile communication terminal 110, transmitting the phone number of the invitation transmitting mobile communication terminal 110 and the plurality of pseudo phone numbers to the mobile communication terminal requesting the invitation information, and comparing the phone number transmitted from the mobile communication terminal requesting the invitation information in response to the transmission of the phone number of the invitation transmitting mobile communication terminal 110 and the plurality of pseudo phone numbers with the phone number of the inviting person's mobile communication terminal 110. The verification processor 304 may determine that a mobile communication terminal is the invitation receiving mobile communication terminal 100 if the phone number transmitted from the mobile communication terminal requesting the invitation information is the same as the phone number of the invitation transmitting mobile communication terminal 110, and may then transmit the identified invitation information to the invitation receiving mobile communication terminal 100.

It should be understood that the service processor 300, the invitation information processor 302, and the verification processor 304 may, in some cases, be separate processors, and, may, in some cases, be integrated into one processor.

Figure 2B:
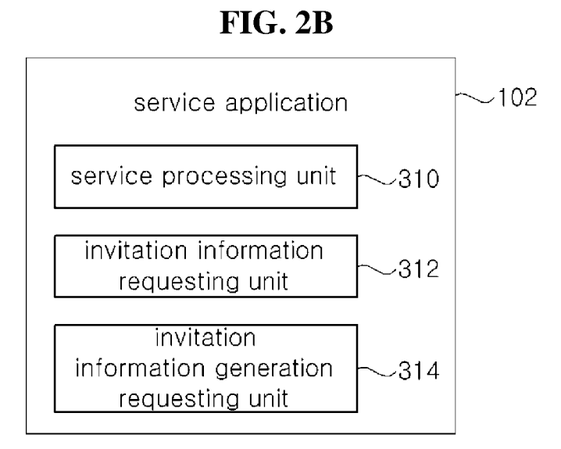
FIG. 2B is a block diagram showing a configuration of a service application according to the exemplary embodiments of the invention.

FIG. 2B is a block diagram showing a configuration of a service application 102 according to exemplary embodiments of the present invention. As shown in FIG. 2B, the service application 102 may include a service processing unit 310, an invitation information transmission requesting unit 312, and an invitation information generation requesting unit 314.

The service processing unit 310 may communicate with the service server 150 to provide a network service, such as a messenger service, a game service, and the like. The network services may be conventional or known in the art.

The invitation information transmission requesting unit 312 may request the service server 150 for the invitation information if the service application 102 is first driven in the invitation receiving mobile communication terminal 100 and may control the service processing unit 310 to perform a function according to the driving URL parameter included in the invitation information transmitted from the server 150 through the verification process.

The invitation information transmission requesting unit 312 may be matched to the verification scheme of the service server 150 to enable communication of information required for the verification. In the first verification scheme, the invitation information transmission requesting unit 312 may extract the phone number of the invitation receiving mobile communication terminal 100 in which the service application 102 is installed at the time of being first driven, generate the invitation information transmission request including the extracted phone number, and transmit the generated invitation information transmission request to the service server 150.

In the second verification scheme, the invitation information transmission requesting unit 312 may transmit the invitation information transmission request to the service server 150 at the time the service application 102 is first driven, and may receive the plurality of phone numbers (the phone number of the inviting person and the plurality of pseudo phone numbers) transmitted from the service server 150. After the invitation information transmission requesting unit 312 receives the plurality of phone numbers, the invitation information transmission requesting unit 312 may retrieve the phone book information of the mobile communication terminal in which the service application 102 is installed to determine which of the plurality of received phone numbers is matched to the phone number stored in the phone book, select one phone number matched to the phone number stored in the phone book of the mobile communication terminal among the plurality of phone numbers, and again transmit the selected phone number to the service server 150.

When the verification succeeds, such that the requested invitation information is transmitted from the service server 150, the invitation information transmission requesting unit 312 may transfer the received invitation information to the service processing unit 310 to allow a predetermined service desired by a user of the invitation transmitting mobile communication terminal 100 to be provided according to the driving URL parameter included in the invitation information.

The service application 102 may also include an invitation information generation requesting unit 314 to configure the invitation information generation request according to the manipulation of the inviting person, to transmit the configured invitation information generation request to the service server 150, to receive the invitation information transmitted from the service server 150 in response to the invitation information generation request, and to transmit the invitation information to the invitation receiving mobile communication terminal 100 through the interworking messaging server 130, in order for the mobile communication terminal in which the service application 102 is installed to serve as the invitation transmitting mobile communication terminal 110 shown in FIG. 1.

The invitation information generation requesting unit 314 may provide an invitation function as one function of the service application 102 and provide a related interface when the a user of the invitation transmitting mobile communication terminal 110 selects the invitation function. Accordingly, the invitation information generation requesting unit 314 may configure and transmit the invitation information generation request or provide a related interface.

The invitation information generation requesting unit 314 may configure the invitation information generation request in a first verification scheme corresponding to the verification processor 304 of the service server 150 and the invitation information transmission requesting unit 312. For example, the invitation information generation requesting unit 314 may generate the invitation information generation request including the invitation phrase, the invitation function, and the phone book information, which is stored in the invitation transmitting mobile communication terminal 110. The invitation information generation requesting unit 314 may then transmit the generated invitation information generation request to the service server 150. To protect personal information, the invitation information generation requesting unit 314 may only provide the final four digits of the phone numbers in a list and allow the four digits to be included as the phone number information in the invitation information generation request.

In the second verification scheme, since only the phone number of the invitation transmitting mobile communication terminal 110 is used to verify the invitation receiving mobile communication terminal 100, the invitation information generation requesting unit 314 may generate the invitation information generation request including the invitation phrase, the invitation function, and the phone number of the invitation transmitting mobile communication terminal 110. The invitation information generation requesting unit 314 may then transmit the generated invitation information generation request to the service server 150.

The first verification scheme will be described in the following example with reference to FIG. 3.

Figure 3:
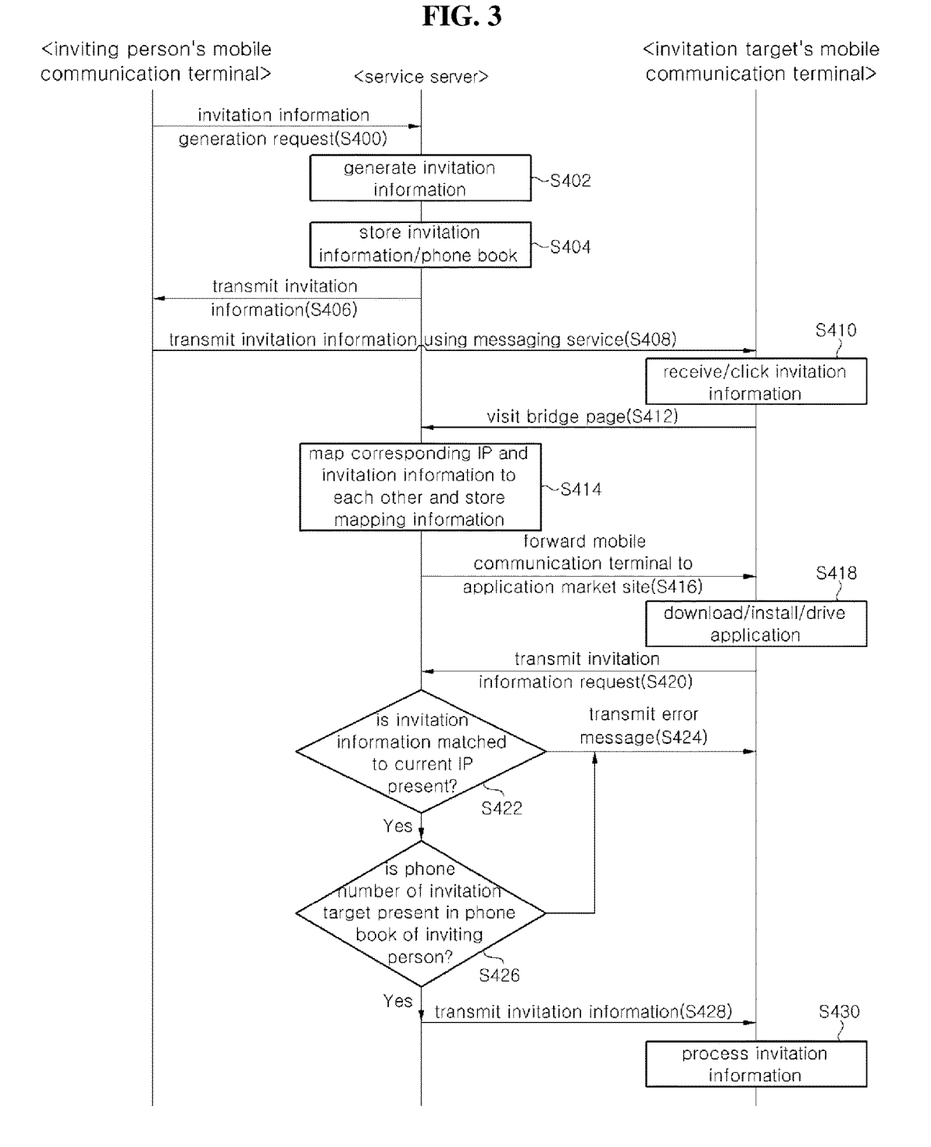
FIG. 3 is a flow chart showing a method for processing invitation information according to exemplary embodiments of the invention.

FIG. 3 is a flow chart showing a method for processing invitation information according to exemplary embodiments of the invention. The invitation transmitting mobile communication terminal 110 may generate and transmit the invitation information generation request to the service server 150 (S400). The invitation information generation request may include the invitation phrase, the invitation function that the invitation transmitting mobile communication terminal 110 is to perform with the invitation receiving mobile communication terminal 100 through the service application 102, and the phone book information stored in the invitation transmitting mobile communication terminal 110.

The service server 150 receives the invitation information generation request and may generate the invitation information including the invitation phrase, the installation URL parameter corresponding to the bridge page URL, and the driving URL parameter corresponding to the invitation function (S402). The service server 150 may store the generated invitation information with the phone book information of the invitation transmitting mobile communication terminal 110 (S404). The service server 150 may, simultaneously (as S404) or sequentially, transmit the generated invitation information to the invitation transmitting mobile communication terminal 110 (S406).

The invitation transmitting mobile communication terminal 110 may receive the invitation information transmitted from the service server 150 and may transmit the invitation information to the invitation receiving mobile communication terminal 100 through the messaging server 130 (S408). Various known messaging services, such as an instant messenger service, an E-mail service, a mobile communication message service, a social network service, and the like, may be utilized to transmit the invitation information. In some cases, the messaging service may directly interwork with the service application 102 to allow the invitation transmitting mobile communication terminal 110 to transmit the invitation information without receiving an input from a user of the invitation transmitting mobile communication terminal 110.

The invitation receiving mobile communication terminal 100 may receive the invitation information through the messaging service. A user of the invitation receiving mobile communication terminal 100 may click (e.g., select) the invitation information to confirm the invitation information displayed on the invitation receiving mobile communication terminal 100 (S410).

When the invitation information is clicked, the invitation receiving mobile communication terminal 100 may determine whether the service application 102 for processing the clicked invitation information has already been installed. If the service application 102 has not been installed, the invitation receiving mobile communication terminal 100 may visit the bridge page using the installation URL parameter (e.g., the URL parameter corresponding to the bridge page URL) included in the invitation information (S412).

The service server 150 may monitor which mobile communication terminals visit the bridge page, and may obtain and store the identification information (e.g., Internet Protocol (IP) address) of the mobile communication terminal visiting the bridge page (e.g., terminal 100). The service server 150 may map the invitation information including the corresponding URL parameter and the identification information of the invitation receiving mobile communication terminal 100 visiting the bridge page to each other using the URL information of the visited bridge page to generate and store mapping information (S414). As described above, the generated and stored mapping information between the specific invitation information and the specific identification information may be valid only for a preset valid time period, and may be automatically discarded or handled as invalid identification information when the preset valid time period expires.

When the obtaining and the storing of the identification information and the mapping information are complete, the service server 150 may forward the mobile communication terminal visiting the bridge page to an application market site in which the service application 102 may be downloaded from (S416). The application market site may be operated by the download server 140.

The invitation receiving mobile communication terminal 100 may download, install, and drive the service application 102 through the application market site (S418). The service application 102 may determine whether the service application 102 is being driven for the first time. If the service application 102 is being driven for the first time, invitation receiving mobile communication terminal 100 may transmit the invitation information transmission request including the phone number of the invitation receiving mobile communication terminal 100 to the service server 150 (S420).

The service server 150 may receive the invitation information transmission request transmitted from the invitation receiving mobile communication terminal 100, may obtain the access identification information of the invitation receiving mobile communication terminal 100, and may determine whether the invitation information mapped to the identification information (e.g., IP address) of the invitation receiving mobile communication terminal 100 is present (S422).

If the invitation information mapped to the identification information of the invitation receiving mobile communication terminal 100 is not present, the service server 150 may transmit an error message to the invitation receiving mobile communication terminal 100 (S424). If invitation information mapped to the identification information of the invitation receiving mobile communication terminal 100 is present, the service server 150 may initiate a verification procedure for determining whether the mobile communication terminal requesting the invitation information is the invitation receiving mobile communication terminal 100 receiving the invitation information.

The service server 150 may determine whether the phone number of the invitation receiving mobile communication terminal 100 included in the invitation information transmission request is present in the phone book received from the invitation transmitting mobile communication terminal 110 in step S404 (S426). If the phone number of the invitation receiving mobile communication terminal 100 is not present in the phone book, the service server 150 may transmit an error message to the invitation receiving mobile communication terminal 100 (S424). If the phone number of the invitation receiving mobile communication terminal 100 is present in the phone book, the service server 150 may transmit the invitation information stored in step S404 to the invitation receiving mobile communication terminal 100 (S428).

The invitation receiving mobile communication terminal 100 may receive the invitation information transmitted from the service server 150, process the invitation information, (e.g., performs a specific function on the service application according to the driving URL parameter included in the invitation information), and obtain a result by the processing of the invitation information (S430). Processing of the invitation information may include various service related actions, such as the sharing of content, a friend relationship setting, a chatting execution, an acquaintance relationship setting, a battle game progress, a cooperation game progress, and the like.

Figure 4:
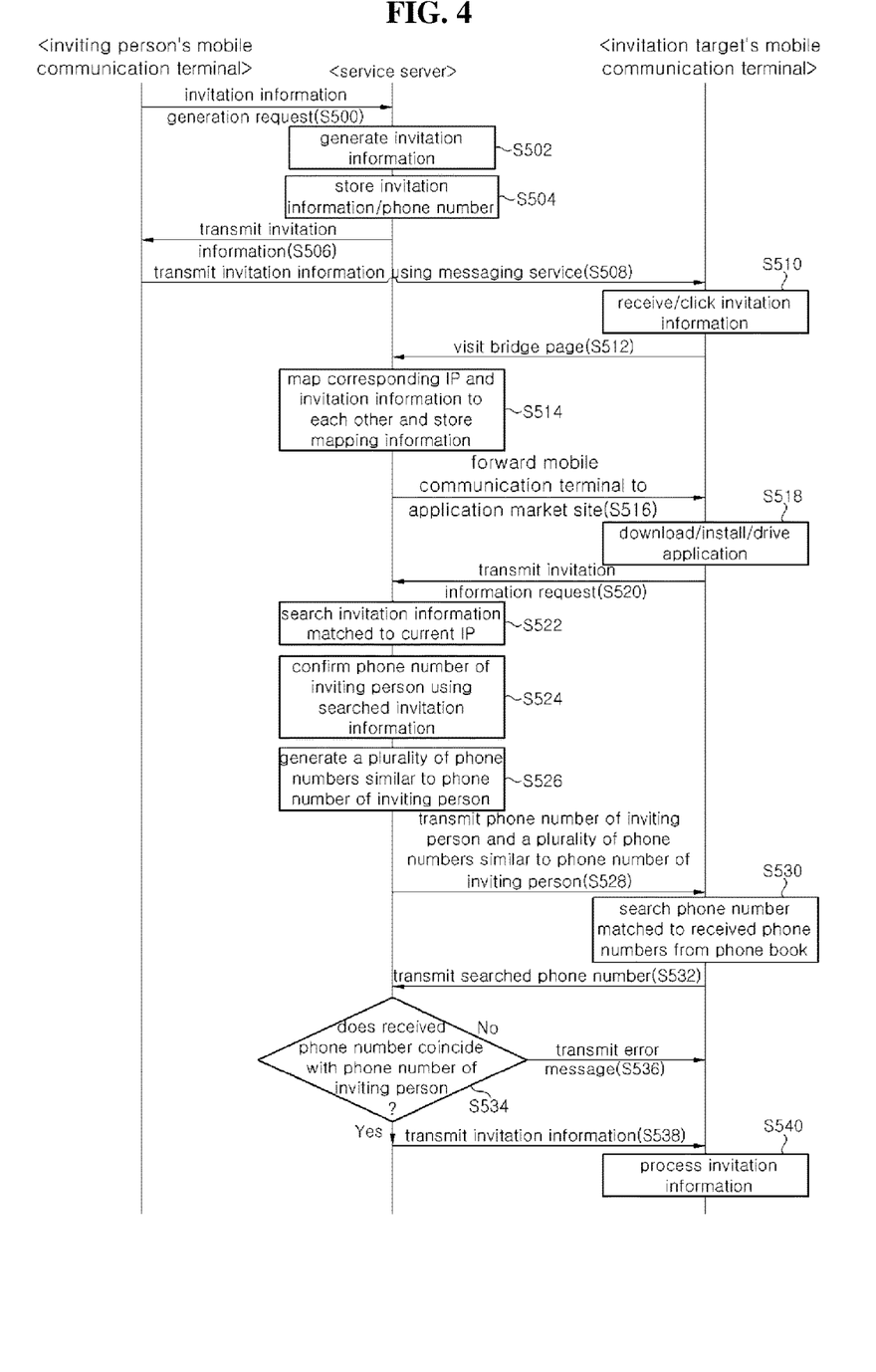
FIG. 4 is a flow chart showing a method for processing invitation information according to exemplary embodiments of the invention.

FIG. 4 is a flow chart showing a method for processing invitation information according to the second verification process according to exemplary embodiments of the invention.

Since steps (S500), (S502), (S504), (S506), (S508), (S510), (S512), (S514), (S516), and (S518) of FIG. 4 correspond to steps (S400), (S402), (S404), (S406), (S408), (S410), (S412), (S414), (S416), and (S418) of FIG. 3, respectively, a description of steps (S500), (S502), (S504), (S506), (S508), (S510), (S512), (S514), (S516), and (S518) will be omitted to avoid repetition, and a description from step (S520) onwards will be provided. Since the second verification process is performed using the phone number of the invitation transmitting mobile communication terminal 110, the invitation information generation request transmitted to the service server 150 in step (S500) includes the phone number of the invitation transmitting mobile communication terminal 110 instead of the phone book of the invitation transmitting mobile communication terminal 110 unlike step (S400) of FIG. 3. In addition, in steps (S502) and (S504), the received phone number of the invitation transmitting mobile communication terminal 110 is stored and associated with the generated invitation information.

After the invitation receiving mobile communication terminal 100 downloads, installs, and drives the service application 102 through the application market site in step (S518), the service application 102 may determine whether the service application 102 is being driven for the first time. If the service application 102 is driven for the first time, the service application 102 may transmit the invitation information transmission request to the service server 150 (S520). Since the second verification process is based, in part, on whether the phone number of the invitation transmitting mobile communication terminal 110 is stored in the invitation receiving mobile communication terminal 100, the phone number of the invitation receiving mobile communication terminal 100 is not included in the invitation information transmission request transmitted to the service server 150 in step (S520).

The service server 150 may obtain the identification information of the invitation receiving mobile communication terminal 100 requesting the invitation information after receiving the invitation information transmission request and may search for the invitation information mapped to the obtained identification information (S522).

When the invitation information mapped to the obtained identification information is searched, the service server 150 may confirm the phone number of the invitation transmitting mobile communication terminal 110 (S524), and may generate a plurality of pseudo phone numbers similar to the phone number of the invitation transmitting mobile communication terminal 110 using a predetermined algorithm for verification (S526).

The service server 150 may transmit a group of phone numbers including the phone number of the invitation transmitting mobile communication terminal 110 and the plurality of pseudo phone numbers to the invitation receiving mobile communication terminal 100 (S528). The invitation receiving mobile communication terminal 100 may receive the group of phone numbers and may then search for a phone number matched to the phone number stored in the phone book among the group of phone numbers (S530).

When a phone number matched to the phone number stored in the phone book among the plurality of received phone numbers is detected, the invitation receiving mobile communication terminal 100 may transmit the detected phone number to the service server 150 (S532). The service server 150 may determine whether the phone number transmitted from the invitation receiving mobile communication terminal 100 is the same as the phone number of the invitation transmitting mobile communication terminal 110 (S534).

If the received phone number is not the same as the phone number of the invitation transmitting mobile communication terminal 110, the service server 150 may transmit an error message to the invitation receiving mobile communication terminal 100 (S536). If the received phone number is the same as the phone number of the invitation transmitting mobile communication terminal 110, the service server 150 may transmit the invitation information stored in step S504 to the invitation receiving mobile communication terminal 100 (S538).

The invitation receiving mobile communication terminal 100 may receive the invitation information from the service server 150, process the invitation information, (e.g., perform a specific function on the service application according to the driving URL parameter included in the invitation information), and obtain a result by processing the invitation information (S540).

A method for processing invitation information according to exemplary embodiments of the present invention will be described with respect to FIG. 5.

Figure 5:
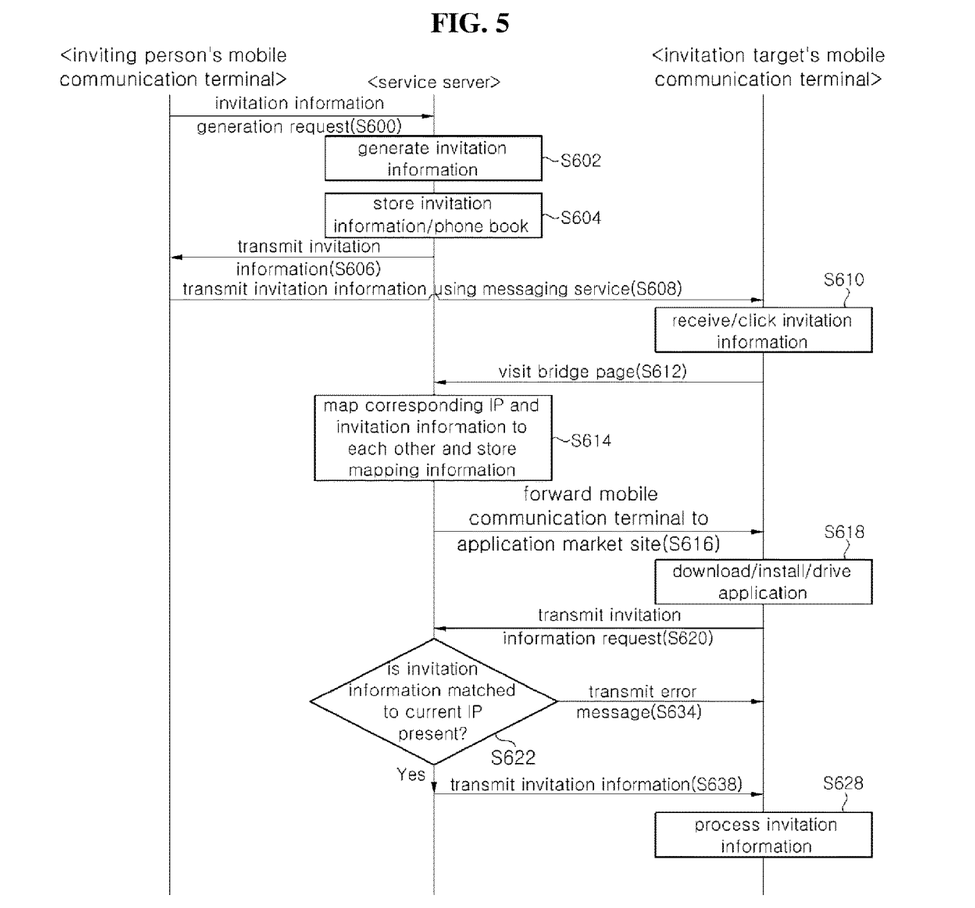
FIG. 5 is a flow chart showing a method for processing invitation information according to exemplary embodiments of the invention.

Unlike the methods described with respect to FIG. 3 and FIG. 4, the method for processing invitation information in FIG. 5 uses only the installation URL parameter and the identification information of the invitation receiving mobile communication terminal 100 included in the invitation information without performing a verification process based on the identification information of the invitation transmitting mobile communication terminal 110 and the invitation receiving mobile communication terminal 100. Therefore, the service server 150 in FIG. 5 may not require a component for processing the identification information of the mobile communication terminals.

Referring to FIG. 5, the invitation transmitting mobile communication terminal 110 may configure and generate the invitation information generation request including the invitation phrase and the invitation function that the invitation transmitting mobile communication terminal 110 is to perform together with the invitation receiving mobile communication terminal 100 through the service application 102 according to an input of a user of the invitation transmitting mobile communication terminal 110. The invitation transmitting mobile communication terminal 110 may then transmit the invitation information generation request to the service server 150 (S600).

The service server 150 may receive the invitation information generation request, and may generate and store the invitation information including the invitation phrase, the installation URL parameter corresponding to the bridge page URL, and the driving URL parameter corresponding to the function desired by the inviting person (S602) and (S604). The service server 150 may transmit the generated invitation information to the invitation transmitting mobile communication terminal 110 (S606).

The invitation transmitting mobile communication terminal 110 may receive the invitation information from the service server 150 and may transmit the invitation information to the invitation receiving mobile communication terminal 100 through the messaging server 130 (S608).

The invitation receiving mobile communication terminal 100 may receive the invitation information through the messaging service, and a user of the invitation receiving mobile communication terminal 100 may then click (e.g., select) the invitation information to confirm the invitation information displayed on the invitation receiving mobile communication terminal 100 (S610).

After the invitation information is clicked, the invitation receiving mobile communication terminal 100 may determine whether the service application 102 for processing the clicked invitation information has been installed. If the service application 102 has not been installed, the invitation receiving mobile communication terminal 100 may visit the bridge page using the installation URL parameter included in the invitation information (S612).

The service server 150 may monitor whether a mobile communication terminal visits the bridge page, and may obtain and store identification information of the visiting mobile communication terminal. The service server 150 may map the invitation information including the corresponding URL parameter to the identification information (e.g., IP information) of the mobile communication terminal visiting the bridge page and store the mapping information (S614). The generated and stored mapping information between the invitation information and the invitation information may be valid for a preset time period and may automatically be discarded or be handled as invalid information when the preset time period expires. The preset time period may be used to provide enhanced security. In some cases, the preset time period may be shorter in the method of FIG. 5 compared to each of the preset time periods of the methods in FIG. 3 and FIG. 4.

After obtaining the identification information and storing the mapping information the service server 150 may forward the mobile communication terminal visiting the bridge page to the application market site where the service application 102 may be downloaded. The application market site may be operated by the download server 140 (S616).

The invitation receiving mobile communication terminal 100 may download, install, and drive the service application 102 through the application market site (S618). The service application 102 may determine whether the service application 102 is being driven for the first time. If the service application 102 is being driven for the first time, the invitation receiving mobile communication terminal 100 may transmit the invitation information transmission request to the service server 150 (S620).

The service server 150 receiving the invitation information transmission request from the invitation receiving mobile communication terminal 100 may obtain the identification information of the invitation receiving mobile communication terminal 100 and may determine whether the invitation information mapped to the identification information of the invitation receiving mobile communication terminal 100 is stored (S622).

If the invitation information mapped to the identification information of the invitation receiving mobile communication terminal 100 is not stored, the service server 150 may transmit an error message to the invitation receiving mobile communication terminal 100 (S624). If the invitation information mapped to the identification information of the invitation receiving mobile communication terminal 100 is stored, the service server 150 may transmit the invitation information stored in step S604 to the invitation receiving mobile communication terminal 100 (S626).

The invitation receiving mobile communication terminal 100 may receive the invitation information from the service server 150, process the invitation information (e.g., perform a function on the service application 102), and obtain a result by processing the invitation information (S628). The processing of the invitation information may include various service related actions, such as the sharing of content, a friend relationship setting, a chatting execution, an acquaintance relationship setting, a battle game progress, a cooperation game progress, and the like.

The exemplary embodiments according to the invention may be implemented in a form of program commands capable of being executed through various computer components to thereby be recordable in a computer-readable medium. The computer readable medium may include program instructions, data files, data structure, or the like, alone or a combination thereof. The program command recorded in the computer-readable medium may be designed and constituted especially for the present invention, or may be known to those skilled in a field of computer software. Examples of the computer-readable recording medium may include a magnetic medium such as a hard disk, a floppy disk, and a magnetic tape; an optical recording medium such as a CD-ROM, a DVD; a magneto-optical medium such as a floptical disk; and a hardware device specially constituted to store and perform program commands such as a ROM, a RAM, a flash memory, or the like. Examples of the program commands may include machine language codes such as being made by compilers as well as high-level language codes capable of being executed by computers using interpreters, or the like. The hardware device may be constituted to be operated as one more software modules in order to perform the action according to the present invention, and vice versa.

It will be apparent to those skilled in the art that various modifications and variations can be made in the invention without departing from the spirit or scope of the invention. Thus, it is intended that the invention cover the modifications and variations of this invention provided they come within the scope of the appended claims and their equivalents.

What is claimed is:

1. A method comprising:
   transmitting invitation information from a service server to a first terminal in response to receiving, at the service server, a request for the invitation information from the first terminal, the invitation information including information configured to be transmitted from the first terminal to a second terminal independently of the service server, the second terminal separate from the service server;
   receiving, at the service server, identification information of the second terminal and mapping, at the service server, the identification information of the second terminal to the invitation information, in response to the second terminal accessing a page using the invitation information received at the second terminal from the first terminal independently of the service server;
   verifying, at the service server, the identification information of the second terminal in response to receiving, at the service server, a request for the invitation information from the second terminal, wherein
      the request for the invitation information from the second terminal includes the identification information of the second terminal, and
      verifying the identification information of the second terminal includes determining that the identification information included in the request for the invitation information from the second terminal is mapped to the invitation information; and transmitting the invitation information from the service server to the second terminal in response to verifying the identification information of the second terminal.

2. The method of claim 1, wherein the identification information comprises at least one of a phone number, a media access control (MAC) address, an Internet Protocol (IP) address, and a personal identification number (PIN) information.

3. The method of claim 1, wherein,
mapping identification information of the second terminal to the invitation information includes,
obtaining internet protocol (IP) information of a mobile communication terminal accessing a service application installation page using the invitation information;
storing the IP information with the invitation information; and
verifying the identification information of the second terminal includes
obtaining IP information of the second terminal in response to installation of the service application; and
comparing the IP information of the second terminal and the stored IP information to verify the invitation information.

4. The method of claim 3, wherein the invitation information comprises at least one of an installation uniform resource locator (URL) parameter for a download site providing a service application for download and a driving URL parameter for performing an operation through the service application.

5. The method of claim 4, wherein,
the installation URL parameter includes a URL address of a bridge page provided by the service server, and
the method further includes
providing instructions to the second terminal to access the bridge page and the service application installation page in response to obtaining the IP information of the second terminal.

6. The method of claim 5, wherein the URL address of the bridge page is uniquely provided for each invitation information.

7. The method of claim 3, wherein the IP information stored in association with the invitation information is valid for a determined period of time.

8. The method of claim 1, wherein verifying the identification information includes
transmitting identification information of the first terminal and pseudo identification information to the second terminal; and
receiving, from the second terminal, the identification information of the first terminal mapped to a phone book stored in the second terminal.

9. The method of claim 1, wherein,
providing the invitation information includes storing the provided invitation information in association with phone book information of the first terminal, and
the verifying is performed based on the phone book information and a personal identification number (PIN) of the second terminal.

10. A method comprising:
receiving invitation information from a first terminal, at a second terminal, independently of a service server that is separate from the first and second terminals;

accessing, at the second terminal, a service application installation page using the invitation information and downloading and installing a service application, such that identification information of the second terminal is received at the service server and mapped, at the service server, to the invitation information;
subsequently to installing the service application, transmitting, from the second terminal, a request to the service server for the invitation information when driving the service application for a first time;
subsequently to transmitting the request for the invitation information, transmitting, from the second terminal, identification information of the first terminal stored in a phone book to the service server in response to a confirmation request for identification information of the first terminal from the service server; and
subsequently to transmitting the identification information, receiving, at the second terminal, the invitation information from the service server and processing the received invitation information.

11. The method of claim 10, wherein transmitting the identification information comprises:
receiving a plurality of identification information comprising the identification information of the first terminal and pseudo identification information associated with the identification information of the first terminal from the service server; and
transmitting at least one identification information mapped to the phone book among the plurality of identification information to the service server.

12. The method of claim 10, wherein the invitation information comprises at least one of an installation URL parameter for a download site providing the service application for download and a driving URL parameter for performing an operation through the service application.

13. The method of claim 12, wherein the installation URL parameter comprises a URL address of a bridge page provided by the service server, and wherein the method further comprises:
accessing the bridge page and the service application installation page.

14. A non-transitory computer readable storage medium comprising an executable program that, when executed, performs a method comprising:
transmitting invitation information from a service server to a first terminal in response to receiving, at the service server, a request for the invitation information from the first terminal, the invitation information including information configured to be transmitted from the first terminal to a second terminal independently of the service server, the second terminal separate from the service server;
receiving, at the service server, identification information of the second terminal and mapping, at the service server, the identification information of the second terminal to the invitation information, in response to the second terminal accessing a page using the invitation information received at the second terminal from the first terminal independently of the service server;
verifying, at the service server, the identification information of the second terminal in response to the invitation information from the second terminal, wherein
the request for the invitation information from the second terminal includes the identification information of the second terminal, and verifying the identification information of the second terminal includes determining that the identification information included in the request for the invitation information from the second terminal is mapped to the invitation information; and transmitting the invitation information from the service server to the second terminal in response to verifying the identification information of the second terminal.

15. A service server, comprising:

an invitation information processor configured to transmit invitation information from the service server to a first terminal in response to a request for the invitation information from the first terminal, the invitation information including information configured to be transmitted from the first terminal to a second terminal independently of the service server, and receive identification information of the second terminal at the service server and map, at the service server, the identification information of the second terminal to the invitation information, in response to the second terminal accessing a page using the invitation information received at the second terminal from the first terminal independently of the service server; and a verification processor configured to, at the service server, verify the identification information of the second terminal in response to receiving a request for the invitation information from the second terminal, wherein the request for the invitation information from the second terminal includes the identification information of the second terminal, and verifying the identification information of the second terminal includes determining that the identification information included in the request for the invitation information from the second terminal is mapped to the invitation information, and transmit the invitation information from the service server to the second terminal in response to the identification information of the second terminal being verified.

16. The service server of claim 15, wherein, the invitation information processor is configured to obtain identification information of a mobile communication terminal accessing a service application installation page using the invitation information, and store the identification information in association with the invitation information, and the verification processor is configured to obtain identification information of the second terminal in response to installing the service application, and compare the identification information of the second terminal with the stored identification information.

17. The service server of claim 15, wherein the verification processor is configured to verify the identification information of the second terminal by transmitting identification information of the first terminal and pseudo identification information to the second terminal and receiving, from the second terminal, the identification information of the first terminal mapped to a phone book stored in the second terminal.

18. A mobile communication terminal, comprising:

a memory storing computer-readable instructions; and a processor configured to execute the computer-readable instructions to cause the mobile communication terminal to receive invitation information from another mobile communication terminal independently of a service server that is separate from the other mobile communication terminal, download and install a service application based on accessing a page supported by the service server, according to the invitation information received from the other mobile communication terminal, such that identification information of the mobile communication terminal is received at the service server and mapped, at the service server, to the invitation information, transmit a request to the service server for the invitation information in response to the service application being installed and driven for a first time, transmit identification information of the other mobile communication terminal stored in a phone book to the service server in response to receiving a verification request for the identification information of the other mobile communication terminal from the service server, receive the invitation information from the service server, and process the received invitation information.

19. A method comprising:

receiving, at a service server, an invitation information generation request, from a first terminal, to provide and store invitation information, the invitation information including information configured to be transmitted from the first terminal to a second terminal independently of the service server, storing the invitation information including associating identification information of the first terminal with the invitation information;

transmitting the invitation information from the service server to the first terminal based on the invitation information generation request;

obtaining, at the service server, identification information of the second terminal using the invitation information and mapping, at the service server, the identification information of the second terminal to the invitation information, in response to the second terminal using the invitation information;

receiving an invitation information request at the service server from the second terminal, based on a service application being installed in the second terminal, the invitation information request including the identification information of the second terminal;

identifying, at the service server, the invitation information mapped to the identification information included in the invitation information request;

obtaining, at the service server, identification information of the first terminal associated with the identified invitation information; and searching the invitation information associated with the obtained identification information of the first terminal to transmit the searched invitation information from the service server to the second terminal.

20. A service server, comprising:

an invitation request processor configured to receive, at the service server, an invitation information generation request, from a first terminal, to provide and store invitation information, the invitation information including information configured to be transmitted from the first terminal to a second terminal independently of the service server, storing the invitation information including associating identification information of the first terminal with the invitation information, transmit the invitation information from the service server to the first terminal based on the invitation information generation request, obtain, at the service server, identification information of the second terminal using the invitation information, and map, at the service server, the identification information of the second terminal to the invitation information, in response to the second terminal using the invitation information; and a verification processor configured to, at the service server, receive an invitation information request from the second terminal, based on a service application being installed in the second terminal, the invitation information request including the identification information of the second terminal, identify the invitation information mapped to the identification information included in the invitation information request;

obtain the identification information of the first terminal associated with the identified invitation information, and search the invitation information associated with obtained identification information to transmit the searched invitation information to the second terminal.

* * * * *